United States Patent
Porterfield et al.

(12) 
(10) Patent No.: US 6,282,589 B1
(45) Date of Patent: *Aug. 28, 2001

(54) SYSTEM FOR SHARING DATA BUFFERS FROM A BUFFER POOL

(75) Inventors: A. Kent Porterfield, New Brighton; Todd C. Houg, St. Francis, both of MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/126,978

(22) Filed: Jul. 30, 1998

(51) Int. Cl.[7] .................................................. G06F 3/00
(52) U.S. Cl. ............................ 710/52; 710/129; 710/128
(58) Field of Search .................................. 710/52, 53, 56, 710/59, 57; 711/202, 203, 205, 206, 207, 170, 173; 1/126, 128, 129, 131; 709/227, 228, 226, 238, 234

(56) References Cited

U.S. PATENT DOCUMENTS

| | | | | |
|---|---|---|---|---|
| 4,056,844 | | 11/1977 | Izumi . | |
| 4,158,235 | | 6/1979 | Call et al. . | |
| 4,509,119 | | 4/1985 | Gumaer, et al. . | |
| 4,511,964 | * | 4/1985 | Georg et al. .................. | 364/200 |
| 4,603,382 | * | 7/1986 | Cole et al. .................... | 364/200 |
| 5,093,912 | | 3/1992 | Dong et al. . | |
| 5,103,393 | * | 4/1992 | Harris et al. .................. | 395/650 |
| 5,161,215 | | 11/1992 | Kouda et al. . | |
| 5,247,649 | | 9/1993 | Bandoh . | |
| 5,287,480 | | 2/1994 | Wahr . | |
| 5,339,411 | * | 8/1994 | Heaton, Jr. ................... | 395/600 |
| 5,420,999 | * | 5/1995 | Mundy ......................... | 395/425 |
| 5,440,692 | | 8/1995 | Janicek . | |
| 5,561,785 | | 10/1996 | Blandy et al. . | |
| 5,577,212 | | 11/1996 | Russ . | |
| 5,613,075 | | 3/1997 | Wade et al. . | |
| 5,644,729 | | 7/1997 | Amini et al. . | |
| 5,771,359 | * | 6/1998 | Galloway et al. ............. | 710/128 |
| 5,850,395 | * | 12/1998 | Hanesn et al. ................ | 370/398 |
| 5,964,859 | * | 10/1999 | Steinbach et al. ............ | 710/129 |
| 5,983,332 | * | 4/1999 | Watkins ........................ | 711/203 |
| 6,041,397 | * | 3/2000 | Rickard et al. ............... | 711/209 |
| 6,055,597 | * | 4/2000 | Houg ............................ | 710/127 |
| 6,073,190 | * | 6/2000 | Rooney ........................ | 710/56 |

* cited by examiner

*Primary Examiner*—Robert Beausoleil
*Assistant Examiner*—Xuong Chung-Trans
(74) *Attorney, Agent, or Firm*—Knobbe, Martens, Olson & Bear, LLP

(57) ABSTRACT

A buffer pool is described for buffering data transfers between components within a computer system. The buffer pool uses a translation table to translate virtual address pointers from calling computer components into physical address pointers within a line buffer array. The virtual address pointers are held in a translation entry table that correlates virtual and physical pointers.

14 Claims, 10 Drawing Sheets

SYSTEM FOR SHARING DATA BUFFERS FROM A BUFFER POOL

RELATED APPLICATIONS

This application is related to patent application Ser. No. 09/126,942, entitled "METHOD FOR SHARING DATA BUFFERS FROM A BUFFER POOL" assigned to Micron Electronics, Inc., concurrently filed and hereby incorporated in this patent application by reference.

BACKGROUND OF THE INVENTION

1. Field of the Invention

The invention relates to computer systems, and more particularly, to an apparatus and method for sharing buffers between bus interfaces and a computer.

2. Description of the Related Technology

Conventional personal computer systems include a processor for processing data, one or more system controllers for controlling data flow between computer buses, and one or more bus bridge circuits for controlling data flow between various bus types within the computer system. In many conventional computer systems, the processor and system controller are controlled by a first clock while the bus bridge and bus components are controlled by a second clock.

For example, an Intel Pentium Microprocessor and its corresponding system controller may be controlled by a 200 MHz clock while the bus bridge circuit may be controlled by a 33 MHz clock. Because of the difference in clock speeds between these components, many computer systems incorporate a series of buffers to manage data transfers from components in one clock domain to components in another clock domain.

In conventional computer systems, a fixed number of data buffers are integrated into the system controller and bus controllers to buffer data transfers between clock domains. For example, many system controllers include a plurality of first-in, first-out data buffers to manage data transfers to/from a Peripheral Component Interconnect (PCI) device and the processor. Similarly, a conventional system controller may employ a plurality of first-in, first-out data buffers to buffer transfers between the processor and the memory subsystem. Other buffers may be located along the memory address bus to buffer transfers from the computer main memory to devices on the PCI bus. Thus, in all, a system controller may incorporate numerous individual buffers, with each buffer being only connected to a particular source and target component.

Although this structure ensures that each data path between clock domains includes a buffer, it leads to an inefficient use of data registers within the system controller. It would be a rare occasion that every data path within a system controller should need a buffer at the same time. Thus, it would be more advantageous to provide a mechanism wherein the data path transferring the greatest amount of data is always provided with a large set of buffers while the data path transferring the smallest amount of data is provided with a minimum amount of buffers.

U.S. Pat. No. 4,158,235, to Call, et al. discloses a buffer pool system that supports bi-directional data transfers between multiple data ports. The Call, et al. buffer pool system includes a control unit and a plurality of individual buffer units wherein each buffer unit has a fixed size. However, in the Call, et al. system, a buffer full status signal indicates that all of the buffers in the buffer pool are full, but does not use a pre-allocation system to identify if particular ports are empty or full. In addition, the Call, et al. system does not allow for concurrent transfers from various components to the buffer pool because of serial arbitration through the control bus. Thus, the state of the art needs a buffer pool system with a higher degree of concurrency to handle data transfers more efficiently.

The strategy in conventional computer systems of providing dedicated buffers for each data path results from a desire to ensure that buffer space is always available for data transfer operations. However, this strategy also requires extensive buffer space for each data path so that consecutive large data transfer operations can be accommodated. Moreover, as bus architecture complexity and operational speed increases, the need for extensive buffering likewise increases. Moreover, because buffer circuits are often integrated into an application specific integrated circuit die, extensive buffering requires additional space on the die, which increases the cost considerably.

However, in practice, the simultaneous need for a plurality of data paths, each having extensive buffer space, is rare because data buffer use is often mutually exclusive. Thus, providing extensive buffer space for each input or output data path wastes a considerable amount of the provided buffer storage space. Furthermore, the wasted buffer space is cumulative since most computer systems include a plurality of interfaces for communicating with numerous peripheral and I/O devices coupled to their respective buses. To enable data transfer between high and low speed components without delaying the high speed components, computer manufacturers require cost effective methods and technologies to increase the efficiency and utilization of buffer storage space.

SUMMARY OF THE INVENTION

One embodiment of the invention is a system for buffering data transfers between components in a computer system. The system includes a plurality of buffers; a first pointer referencing the address of a computer component; a second pointer referencing at least one buffer in the plurality of buffers; and a translation table, wherein the translation table comprises entries correlating the value of the first pointer with the value of the second pointer.

Another embodiment of the invention is a system in a computer for transferring data from a first clock domain to a second clock domain. The system comprises a first pointer in communication with a first component in the first clock domain and with a plurality of buffers; a table in communication with the plurality of buffers, said table comprising a plurality of storage locations; a first storage location in the table for storing the value of the pointer; a second storage location in the table for storing a reference to one or more buffers in the plurality of buffers; and a third storage location in the table for storing the port value of the first component.

Yet another embodiment of the invention is a computer system that includes a processor; a first pointer in communication with said processor and with a plurality of buffers; and a table in communication with the plurality of buffers, said table comprising a plurality of storage locations; a first storage location in the table for storing the value of the pointer a second storage location in the table for storing a reference to one or more buffers in the plurality of buffers Still another embodiment is a system in a computer for transferring data in the computer, comprising: means for providing the address of data to be transferred; means for allocating a buffer from a plurality of buffers to temporarily store said data; means for transferring the data from the provided address to the allocated buffer.

One other embodiment is a programmable storage device having instructions that, when executed, perform the method of:

provided an address identifying a location of data to be transferred;

allocating a buffer from a plurality of buffers to temporarily store said data; and transferring the data from the location identified by the provided address to the allocated buffer.

DETAILED DESCRIPTION

Figure 1:
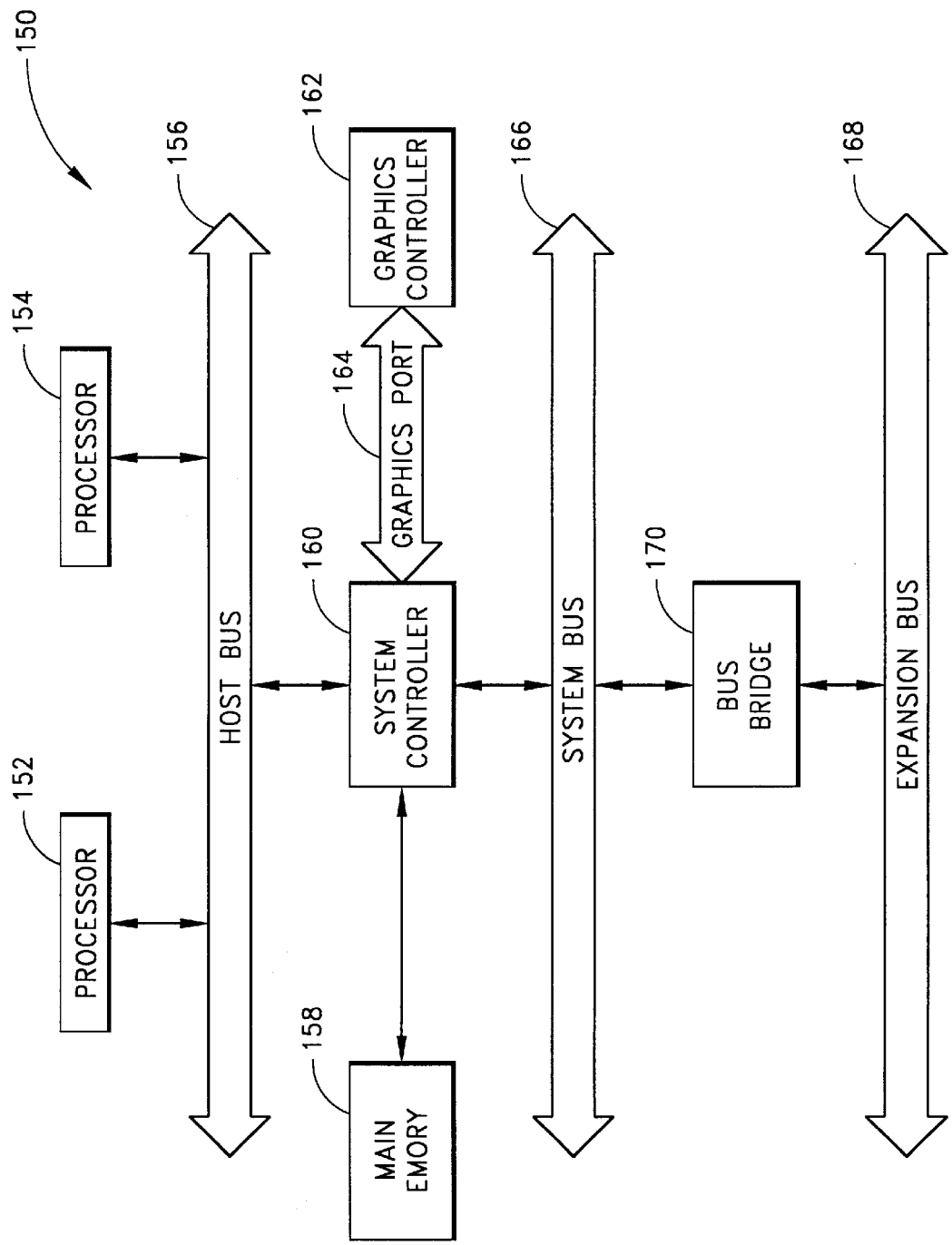
FIG. 1 is a block diagram of the architecture of a computer system including a system controller with a buffer pool.

The following detailed description presents a description of certain specific embodiments of the invention. In this description, reference is made to the drawings wherein like parts are designated with like numerals throughout.

For convenience, the discussion of the invention is organized into the following principle sections: Introduction, Overview, Buffer Pool System, Process Overview and Conclusion.

Introduction

As discussed above, a conventional computer system includes a system controller for transferring data between the various components within the computer system. The components might be, for example, the processor, the memory and the internal computer buses. Embodiments of this invention include computer systems, motherboards, system controllers, discreet circuits and other computer components that utilize a shared buffer pool to buffer data transfers between components within a computer system. The computer system can be based on an Intel Pentium microprocessor, Digital Equipment Corporation Alpha microprocessor or any other general or specific microprocessor utilized within a computer system. In addition, embodiments of this invention include computer systems that include more than one microprocessor. Such computer systems are commonly referred to as multiprocessor computers and may contain 2, 4, 8 or more microprocessors.

The system controller in conventional computer systems includes sets of individual buffers for managing data transfers between computer components. In contrast, embodiments of this invention include system controllers and other computer components having a pool of buffers to manage data transfers from the different components. This structure is referred to as a buffer pool. The buffers within the buffer pool system are allocated on an "as needed" basis. Accordingly, computer components make a request to buffer data, and the buffer pool allocates a certain amount of register space from the buffer pool to the calling component. As used herein, the calling component is the circuit in the computer system that makes a request to the buffer pool for a data read or write.

The buffer pool normally contains more buffer space than any single data buffer in the prior art systems. For example, a typical buffer might contain 256 bytes (8 cache lines) of buffer space. However, embodiments of the buffer pool described herein might contain 1K, 4K, 8K or more bytes of buffer space.

Each component in the computer uses a component interface to communicate with the buffer pool. This component interface includes the control and data lines for reading and writing data to/from the buffer pool. During a read or write cycle, the component interface can assert an allocation signal to indicate that a buffer in the buffer pool should be allocated, or reserved, for a future read or write. In addition, the calling component interface sends a pointer value identifying the address holding the read/write data.

Once a pointer value is received, a line buffer array is scanned to determine if any space is available for the new request. If such space is available, the buffer pool asserts an EMPTY signal to signify that it can accept a future read or write. The buffer pool also stores the value of the pointer in a translation entry table so that the value of the pointer is associated with the allocated space in the line buffer array. Thus, the translation entry table translates the "virtual" pointers from the component interface into physical pointers to the buffer space. Because the pointers to the buffer pool are virtual, the control of the buffers from the perspective of the component interface remains essentially the same as in prior systems. Once a physical buffer in the line buffer array has been allocated, the calling component can begin sending data to the buffer. The data is sent by the calling component to the "virtual" pointer address, which is translated in the translation entry table to a physical address within the line buffer array. Data can be sent 8, 16, 32 or 64 bits at a time. In addition, the data can be sent from several components simultaneously to the buffer pool. The buffer pool will translate and multiplex each word of data to its proper physical position in the line buffer array. This allows for very fast, concurrent operation of the buffer pool.

Overview

Referring now to FIG. 1, a computer system architecture 150 includes a pair of processors 152, 154 coupled to a host bus 156. The processors 152, 154 communicate with a main memory 158 through a system controller 160 coupled to the host bus 156. In one embodiment, the processors 152, 154 comprise an Intel® Pentium® Pro or Pentium® II processor and the host bus 156 is a pipelined Pentium® Pro processor bus. In another embodiment, the processors 152, 154 are Intel Pentium® processors and the host bus 156 is a Pentium host bus.

In addition, the system controller 160 communicates with a graphics controller 162 through an accelerated graphics port (AGP) 164. The AGP 164 is not a bus, but a point-to-point connection between an AGP compliant target, the system controller 160, and an AGP-compliant master, the graphics controller 162. The point-to-point connection provided by the AGP 164 enables data transfers on both rising and falling clock edges, improves data integrity, simplifies protocols and eliminates bus arbitration overhead.

The system controller 160 also communicates with a system bus 166, which may be coupled to one or more peripherals (not shown), such as disk controllers and local area network cards. These peripherals communicate with the main memory 158 and the system controller 160 through the system bus 166. In one embodiment, the system bus 166 is the Peripheral Component Interconnect (PCI) bus, which supports multiple peripheral components and add-in cards at a peak bandwidth of 133 megabytes/sec.

Lastly, the system bus 166 communicates with an expansion bus 168 through a bus bridge 170. In one embodiment, the expansion bus 168 is the Industry Standard Architecture (ISA) bus, which may be coupled to one or more low bandwidth I/O devices (not shown), such as an audio card or a modem. The system controller 160 controls data transfer among the system bus 166, the graphics controller 162, the main memory 158 and the processors 152, 154 through the host bus 156. Similarly, the bus bridge 170 controls data transfer between the system bus 166 and the expansion bus 168. Among other things, the system controller 160 and the bus bridge 170 serve to synchronize the transfer of data between buses having different data widths and speeds.

Figure 2:
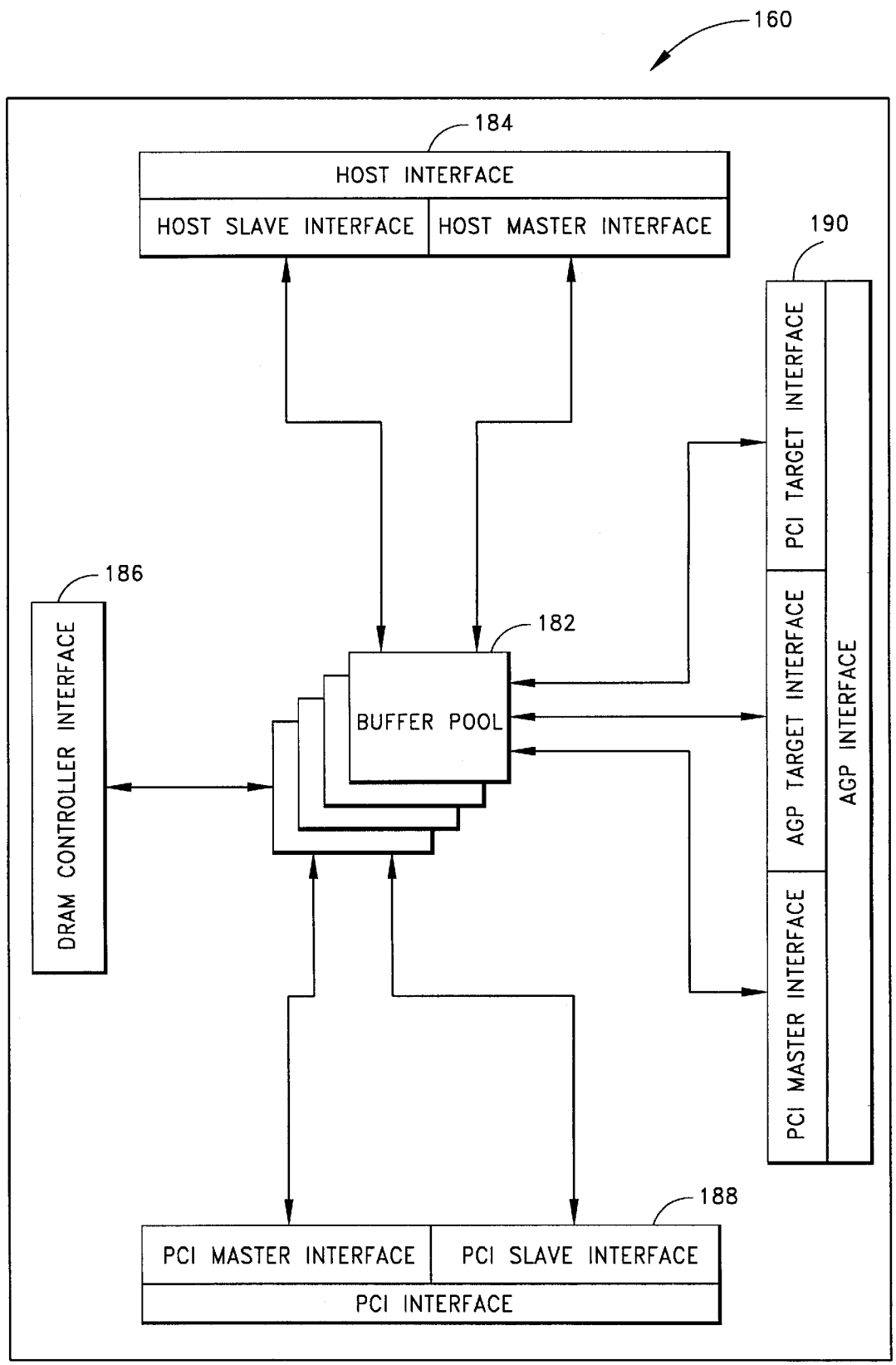
FIG. 2 is a block diagram of the system controller of FIG. 1 including a buffer pool and interfaces.

FIG. 2 is a block diagram illustrating several features within one embodiment of the system controller 160. The system controller 160 provides a shared buffer pool 182 having a capacity large enough to manage data buffering between several components, but smaller than the total capacity of all of the dedicated buffers of prior art system controllers. Generally, the system controller 160 includes a plurality of interfaces for communication with various components.

For example, in one embodiment, the system controller 160 includes a host interface 184 for communication with the host bus 156, a memory interface 186 for communication with the main memory 158, a system bus interface 188 for communication with the system bus 166, and an AGP interface 190 for communication with the graphics controller 162 through the AGP 164. Each of these interfaces 184, 186, 188, 190 includes circuitry to implement communication protocols for their respective interface. For example, during communication between the host bus 156 and the system bus 166, the system controller 160 may act as both a bus master as well as a slave.

Buffer Pool System

Figure 3:
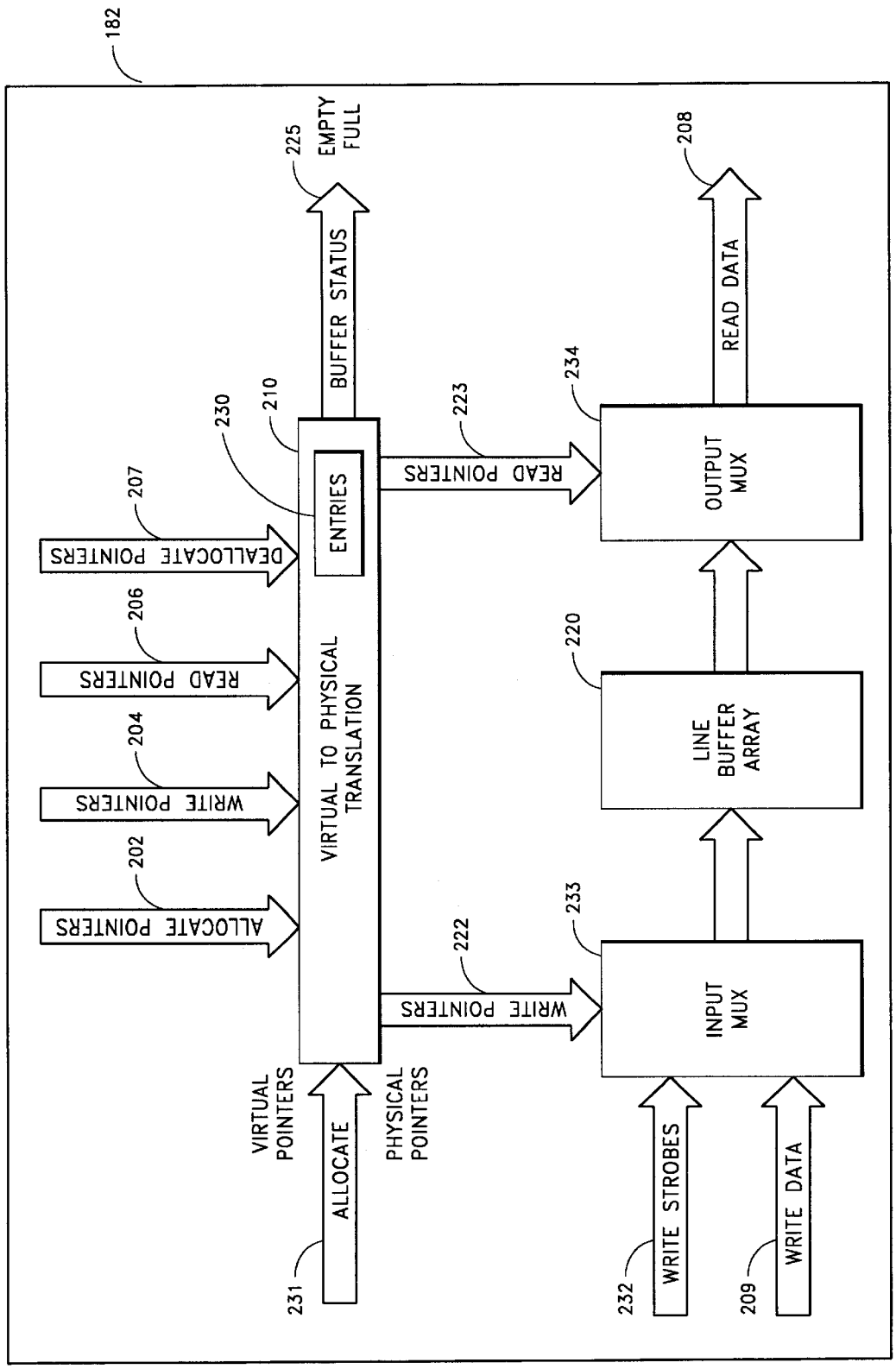
FIG. 3 is a representation of the elements of the buffer pool of FIG. 2 including various pointers used to access the buffer pool.

Referring to the embodiment illustrated in FIG. 3, each component interface 184, 186, 188, 190 (FIG. 2) presents one or more virtual pointers to the buffer pool 182. The virtual pointers include an ALLOCATE virtual pointer 202, WRITE virtual pointer 204, READ virtual pointer 206 and DEALLOCATE virtual pointer 207. These pointers are designated as "virtual" because they do not actually refer to a physical storage location within the buffer pool 182. The virtual pointers contain a value from the component interface that identifies the address holding read data 208 or write data 209.

The virtual pointers access a translation system 210 that correlates each virtual pointer from the component interface with a position in a line buffer array 220. The positions in the line buffer array 220 are accessed by a physical WRITE pointer 222 and a physical READ pointer 223.

The pointers 222 and 223 are designated as "physical" because they refer to actual physical locations within the line buffer array 220. The line buffer array 220 provides the register space that holds the read/write data. In this embodiment, the line buffer array contains 32 cache lines of register space. Of course, embodiments having more or less register space are contemplated.

Because the system components (processor, memory, etc.) access virtual pointers, control of the buffers from the perspective of each component remains essentially the same as prior systems with individual buffers assigned to each component. Each component accesses the buffer pool as it would any other set of buffers, by incrementing read/write pointers and waiting for assertion of an empty/full status line 225 from the system controller 160.

During a write cycle, each component interface presents a set of virtual pointers, signals and write data 209 to the buffer pool system 182. The first signal is normally the ALLOCATE signal 231. If a FULL status is deasserted, one of the buffer status signals 225, then the component interface begins sending write data 209 and asserting a write signal 232 into an input multiplexer 233. In one embodiment, each port provides its own write signal 232 into the input multiplexer 233. The input multiplexer 233 then selects the correct line within the line buffer array 220 based on the incoming write signal 232 and the value of the physical write pointer 222. It should be noted that several data writes can proceed simultaneously using the mechanism described above.

During a read cycle, the buffer pool returns read data 208 and status signals 225 to each component interface. A component interface makes a read request using the virtual read pointer 206. The value of the virtual read pointer 206 is translated by the translation system 210 into a physical read pointer 223 that selects read data 209 from an output multiplexer 234. In one embodiment, there is one output multiplexer 234 for each port in the computer. In one embodiment, there are three output multiplexers. Each one of the output multiplexers is linked to the read pointer 223.

Figure 6:
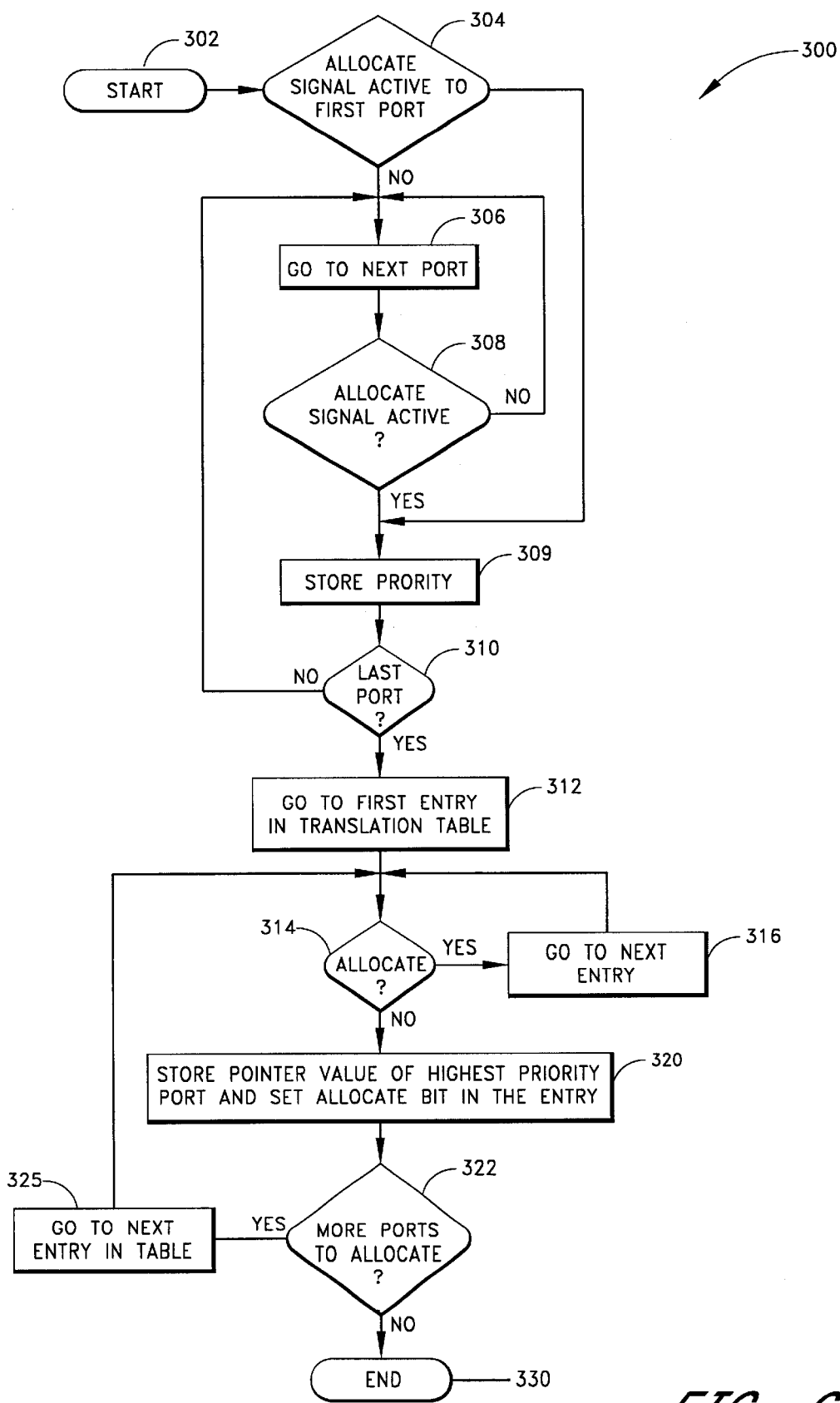
FIG. 6 is a flow diagram illustrating a process for allocating a buffer.

The buffer pool mechanism also can include an ALLOCATE signal 231 that is used to indicate that a component interface is attempting to allocate a buffer in the buffer pool. Thus, when the ALLOCATE signal is asserted, the allocation process described below in reference to FIG. 6 is being performed.

The shared buffer pool system 182 allocates buffer capacity on an as-needed basis. Thus, the buffer pool system 182 reduces the overall quantity of buffers in the system controller 160 while providing each component with additional buffer capacity during peak read or write cycles. In this manner, the buffer pool increases system peak performance while reducing system controller costs by using less die space for the data buffers. The translation system 210 includes a translation entry table 230 that relates each virtual pointer to a physical position in the line buffer array 220.

Figure 4:
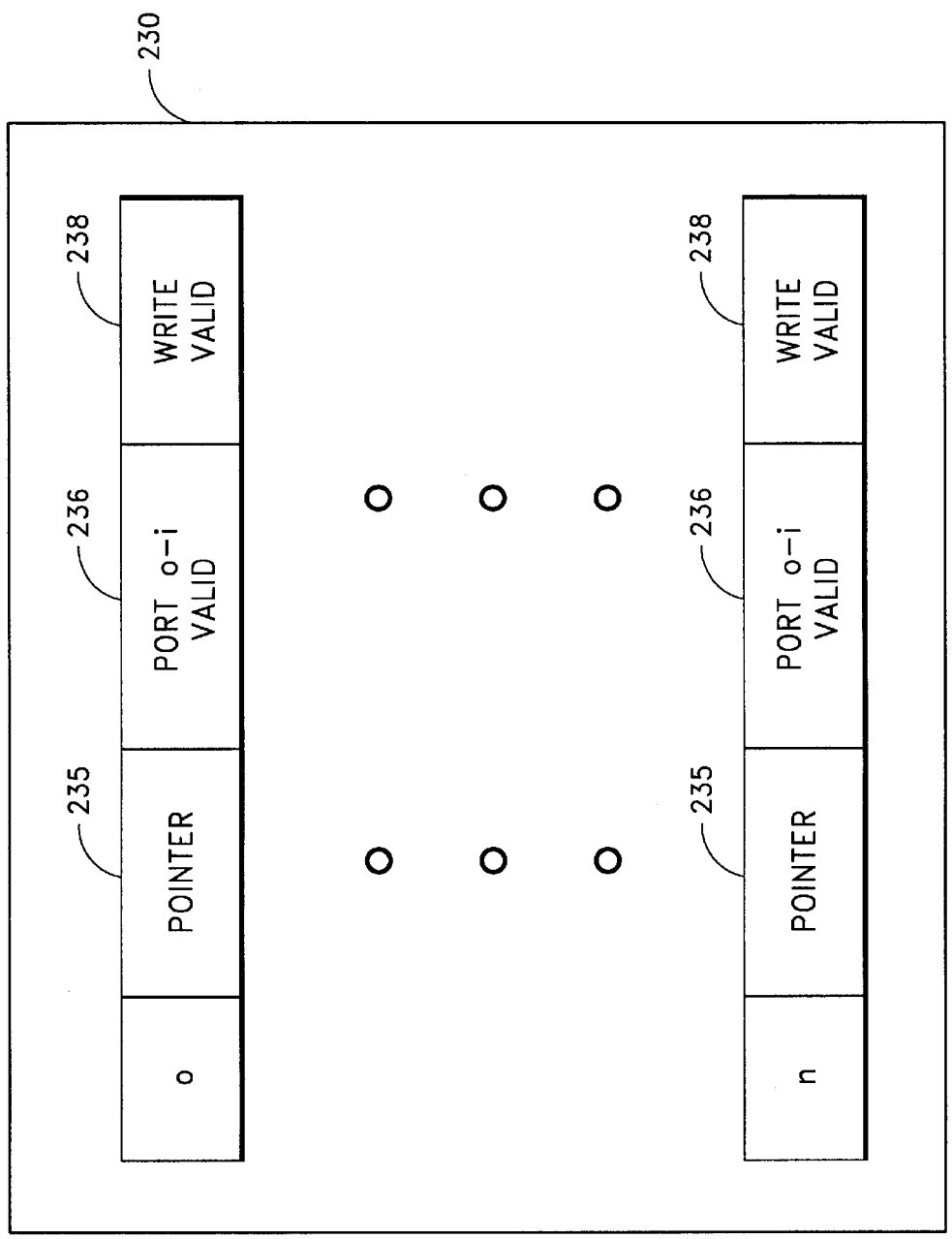
FIG. 4 is a flow chart of a process of allocating a buffer.

FIG. 4 illustrates the structure of one embodiment of a translation entry table 230. The translation entry table 230 is used to correlate the incoming virtual pointers with the locations in the line buffer array 220. Each row in the translation entry table 230 includes an entry for the value of the virtual pointer 235, the allocated port number 236 and a write valid flag 238.

There is one entry in the translation entry table 230 for each of the (0–n) buffers in the line buffer array 220. For example, if the line buffer array contained 64 separate buffers, the translation entry table 230 would have 64 rows. Thus, each line (0–n) in the line buffer holds values for a corresponding virtual pointer 235, allocated port 236, and write valid flag 238.

The allocated port number 236 refers to the port (0:i) bits indicating the source or destination port for the data. In one embodiment, there are three possible ports: the processor, the PCI interface and the AGP Interface. Only one port value is set for each entry in the translation entry table, indicating which port within the computer system has been allocated to this buffer.

The pointer field 235 of an entry in the translation entry table 230 holds the value of the virtual pointer from the component interface when the buffer was allocated. Thus, this stored copy of the virtual pointer can be used to identify the address where the data to be buffered has been stored. Of course, during a read cycle, the virtual pointer would refer to the address where the data is to be sent.

The write valid flag 238 is set to indicate that a component has completed a write operation to the physical buffer associated with the entry in the translation entry table 230. In one embodiment, the write valid flag 238 is a single bit that is set to 1 when its corresponding physical buffer contains complete data and is set to 0 when the buffer is waiting for a data write to be completed. However, other embodiments wherein the write valid flag includes more than one bit are contemplated.

Figure 5:
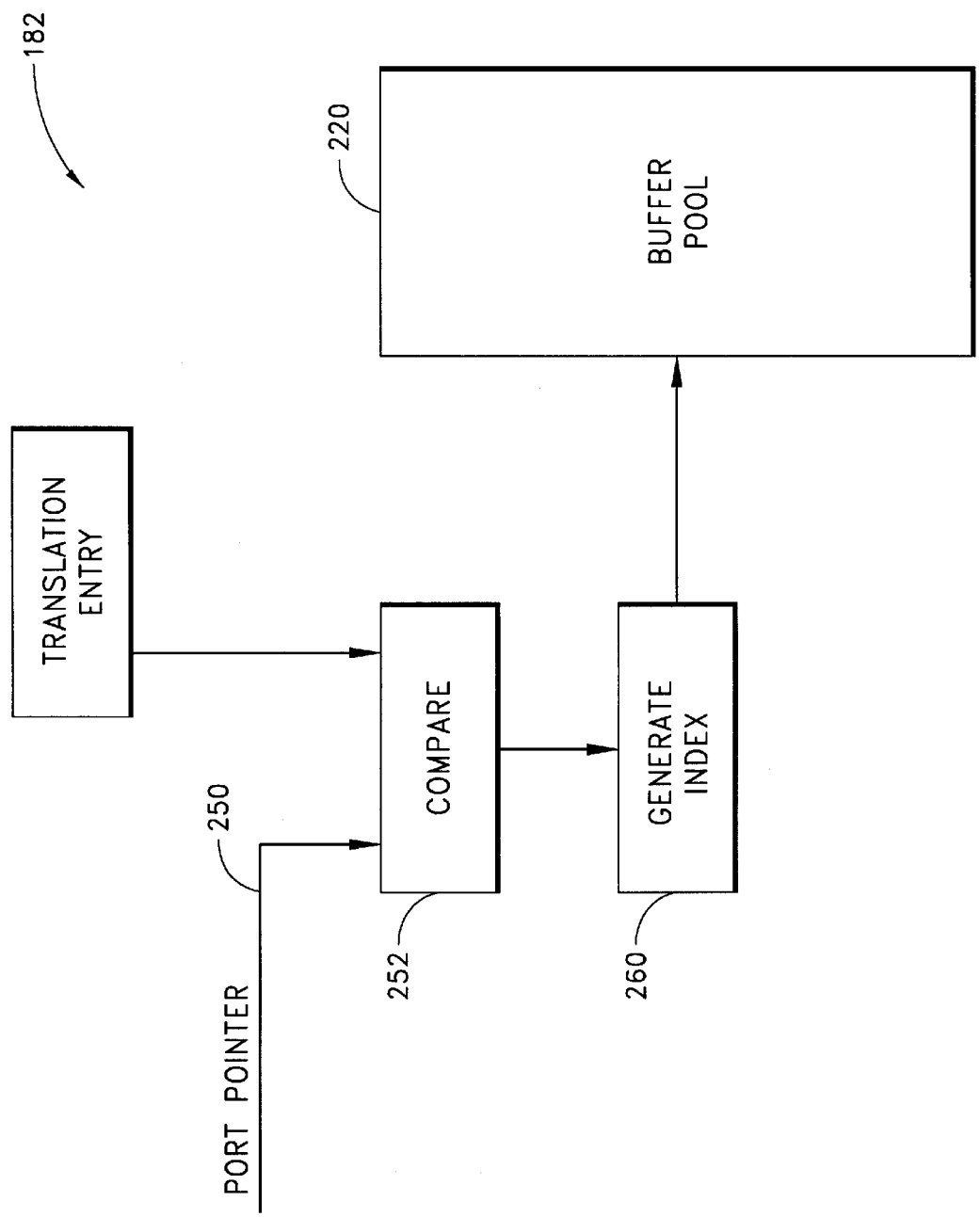
FIG. 5 is a diagram illustrating a circuit for converting a virtual address for a physical location.

Referring to FIG. 5, one circuit for converting a virtual address to a physical location in the line buffer array 220 is illustrated. As shown, a virtual pointer 250 (WRITE, READ or DEALLOCATE) is connected to a compare system 252. The compare system 252 then compares the value of the virtual pointer 250 with each location in the translation entry table 230 until the value of the virtual pointer 250 matches with the pointer value 235 (FIG. 4) stored in the table. The compare circuit 252 then also checks to ensure that the allocated port number 236 matches the port number of the component that is sending the pointer. Once a match is found, the number of the row in the virtual translation table 230 holding the matched pointer value is used to generate an index 260 for accessing the line buffer array. The physical location of the buffer is generated by the position of the entry in the translation entry table 230. For example, if entry number 3 has a pointer value and port number that match, the physical address generated is to buffer number 3 in the line buffer array 220.

Process Overview

The following sections provide a description of the allocating, writing, reading and deallocating processes undertaken within embodiments of the buffer pool system. It should be noted that these processes can be controlled by software running in any type of memory within the computer system. In addition, embodiments of the invention may utilize firmware stored within programmed storage devices such as Programmable Read-Only Memories (PROMs) or Application Specific Integrated Circuits (ASICs).

Allocating a Buffer

In many cases, it is preferable to allocate space for data before the data is actually provided. In multitasking computer systems, this allows for data transfers to be performed based on their priority. For example, if five different write requests are made simultaneously to the buffer pool, each request can be allocated a buffer. Once the buffers are allocated, the higher priority writes are performed before the lower priority writes. This results in the computer system being more efficient overall.

In addition, the logic should preferably determine whether there is space available before the data transfer can begin. Consequently, a buffer is allocated before the transfer begins.

For this reason, computer components first allocate, or reserve, space in the buffer pool. To allocate a buffer, a component interface issues a pointer to a virtual buffer and asserts an ALLOCATE signal. The buffer pool will first determine if any physical buffers are available in the line buffer array. If there are available buffers in the line buffer array, an entry is made in the translation entry table. Information from the calling component is thereby associated with the available physical buffer.

The information saved during the allocation process is the virtual pointer value, the allocated port number, and an occupied status to indicate that the physical buffer has been allocated. A status signal is returned to the calling component to indicate that the allocation was successful. The virtual buffer pointer is now mapped to a physical buffer for the calling component only. Each component in the computer system may allocate as many buffers as desired without using them.

Referring to FIG. 6, a process 300 of allocating a buffer is described more particularly. The process 300 begins at a start state 302 and then moves to a decision state 304 wherein a determination is made by the buffer pool system whether an ALLOCATE signal is active at a first port in the computer system. As is known, a port describes the location of components within the computer system. Thus, every component interface will provide a unique port number so that it can be addressed within the computer system.

If a determination is made at the decision state 304 that the first port is not asserting the ALLOCATE signal, the process 300 moves to a state 306 wherein the next port is identified. The process 300 then moves to a decision state 308 to determine whether an ALLOCATE signal is active for the currently selected port. If the ALLOCATE signal is not active, the process 300 returns to the state 306 so that the next port in the computer system can be analyzed.

However, if the ALLOCATE signal is active for the current port at the decision state 306, the process 300 moves to a state 309 and stores the priority level of the currently selected port. In conventional personal computer systems, each port is assigned a predetermined priority level. A priority level is assigned by each port such that an ALLOCATE signal from particular ports will have a higher priority than ALLOCATE signals from other ports. This priority system is in place so that particular components within the computer system will have their requests handled before other components. Note that if the ALLOCATE signal was active at the first port at decision state 304, the process 300 moves immediately to the state 309 wherein the priority of the first port is stored.

The process 300 then moves to a decision state 310 to determine whether the current port is the last port within the computer system to be analyzed for a data transfer. If a determination is made that the current port is not the last port to be analyzed within the computer system, the process 300 returns to the state 306 to analyze the next port. However, if a determination is made at the decision state 310 that the current port is the last port, then the process 300 moves to a state 312 to identify the first entry in the translation entry table 230 (FIG. 3).

The process 300 then moves to decision state 314 to determine whether the identified entry within the translation entry table 230 has already been allocated to a different component. This determination is made by reading the ALLOCATE flag 236 (FIG. 4) of the current entry. If the ALLOCATE flag 236 has been set for the current entry at the decision state 314, the process 300 moves to state 316 to analyze the ALLOCATE flag for next entry in the translation table 230. It should be noted that the ALLOCATE flag 236 can be a bit or series of bits in various embodiments of the buffer pool system.

If a determination is made at the decision state 314 that the ALLOCATE flag 236 for the current entry has not been set, the process 300 moves to a state 320 wherein the pointer value of the highest priority port to be allocated is stored into the current entry. In addition, the ALLOCATE flag 236 for the current entry is set to indicate that this buffer has now been allocated. The process 300 then moves to a decision state 322 to determine whether other prioritized ports need to allocate buffers within the buffer pool.

If more ports do need to allocate buffers, the process 300 moves to a state 325 to select the next entry in the translation entry table 230. The process 300 then moves to the decision state 314 determine if the ALLOCATE flag has been set for the currently selected entry in the translation entry table 230. If a determination is made at the decision state 322 that each of the ports has been allocated to an entry within the translation entry table, the process ends at an end state 330.

It should be noted that multiple ports may allocate buffers concurrently. As long as the number of available buffers is greater than or equal to the number of allocating ports, all ports will be allocated.

Now that the each component has allocated a particular buffer in the line buffer array, a data transfer process can be initiated. The following section describes one method for writing data to an allocated buffer in the buffer pool.

Writing to a Buffer

To initiate a write to the buffer pool once a buffer has been allocated, the calling component (e.g.: the computer component wishing to write data) provides a virtual line pointer, a chunk pointer, and a write strobe to the buffer pool. Within conventional Intel Pentium class computer systems, a line pointer is used to reference the address of 256 bits of data. A chunk pointer specifies a particular 64 bit chunk of data within the line.

As discussed above, the translation system 210 (FIG. 3) translates the virtual line pointer to a physical location that references a particular buffer in the line buffer array. The physical location is then used to provide a write signal to multiplex the write data to the appropriate data chunk within the line buffer array. The selected line buffer is normally loaded with the write data from the calling component when the write signal is active. Data is normally not written until the write signal is active.

During a write cycle, the allocated buffer is marked as in use when the write strobe is active. This assists in generating buffer status back to the calling component. A component can write to the target buffer in the buffer pool as long as it remains allocated (e.g.: the ALLOCATE flag is set).

Figure 7A:
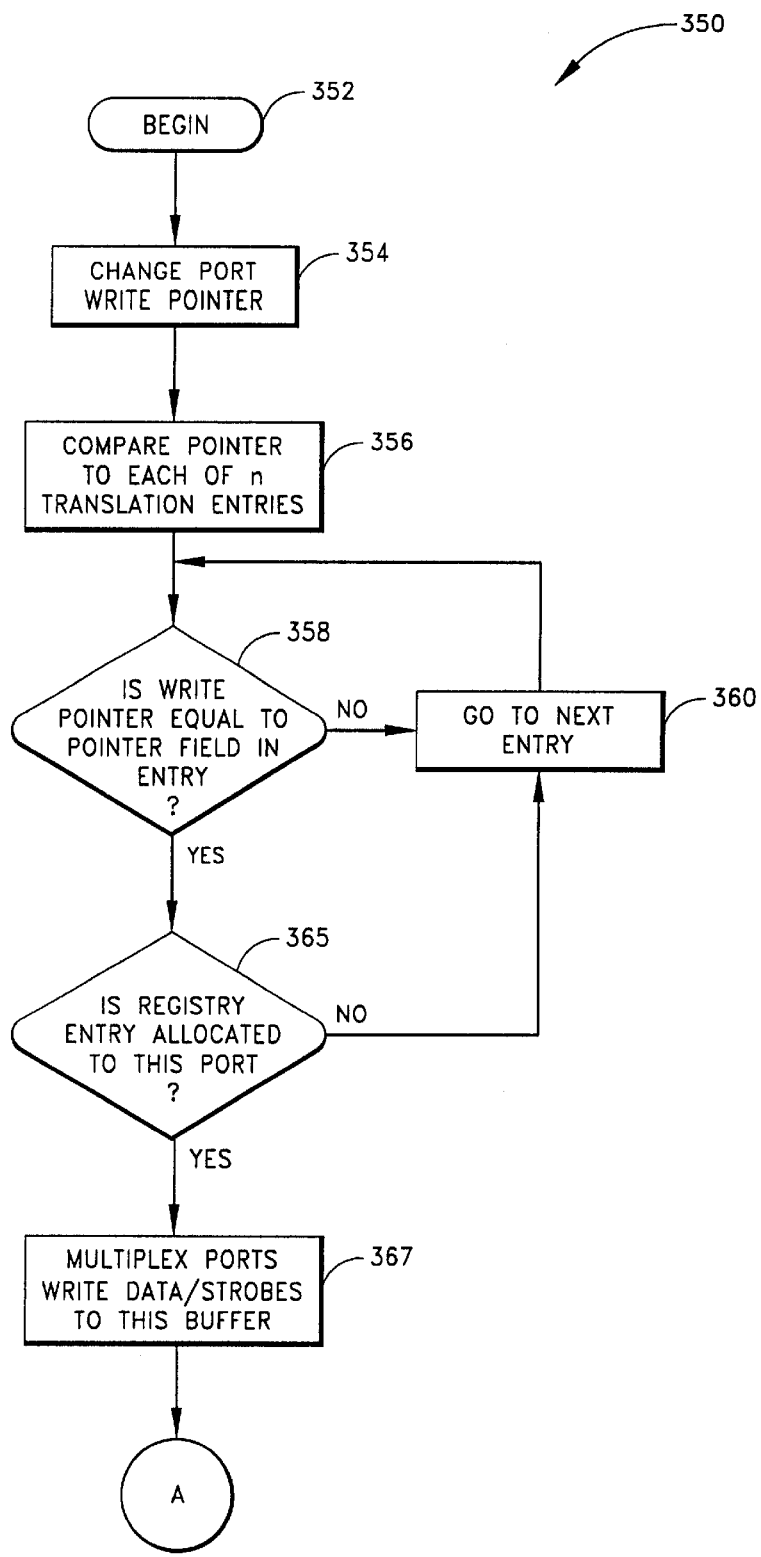
FIGS. 7A–7B are a flow chart of a process of writing to an allocated buffer.
Figure 7B:
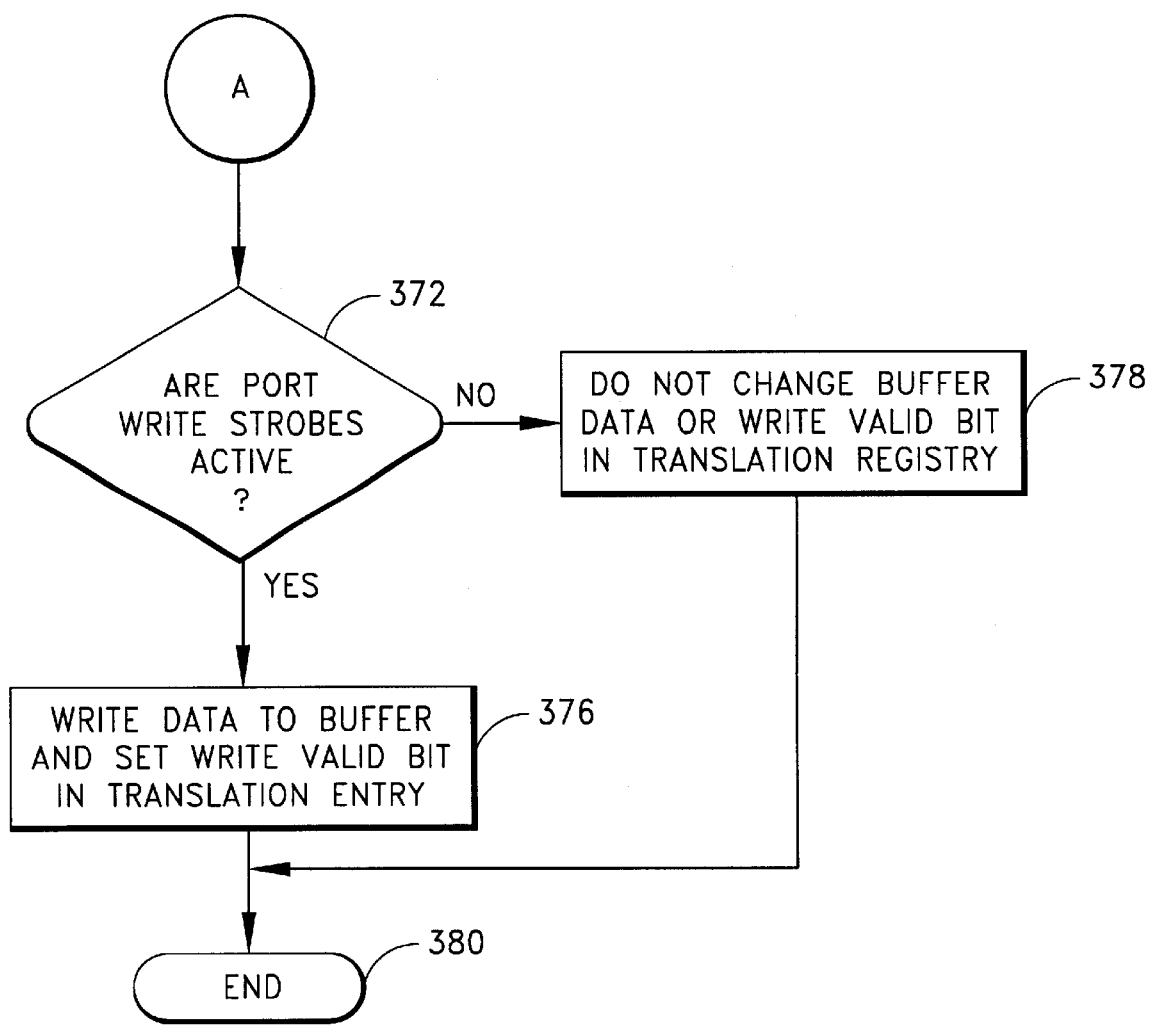

A process 350 (FIGS. 7A–7B) of writing to an allocated buffer begins at a start state 352 and then moves to a state 354 wherein the write pointer from the selected port changes value. This indicates to the buffer pool that the particular port has a new data write to initiate. The process 350 then moves to a state 356 wherein the pointer value 235 in each entry in the translation entry table 230 is compared to the value of the write pointer. A decision is then made at a decision state 358 to determine whether the write pointer value is equal to the value of the pointer field in the first entry of the translation entry table 230.

If the write pointer value does not equal to the value of the first entry in the translation entry table, the process 350 moves to a state 360 wherein the write pointer value is compared to the next entry in the translation entry table 230. This process continues until a determination is made at a decision state 358 that the write pointer equals the value of the pointer field in an entry of the translation entry table 230. The process 350 then moves to a decision state 365 to determine whether the PORT field 236 of the current entry in the table contains the value of the calling port. This ensures that the correct entry in the translation entry table has been located. If the current entry in the PORT field 236 does not hold the port value of the calling component, the process returns to the decision state 358.

However, if the current entry in the PORT field 236 does equal the value of the port that has asserted the write pointer, the process 350 moves to a state 367 wherein the write data from the current port is multiplexed to the buffer pool by asserting a write signal to the input multiplexer and placing its data on the data bus. Although data is normally sent 8 bytes at a time, other embodiments of the buffer pool system could send data 2, 4, 8 or more bytes at a time without departing from the spirit of the invention.

As data is being written to the data buffer, the process 350 moves to a state 372 (FIG. 7B) to determine whether the current port write signal is still active. If the write signal is active, indicating that data writes are in progress, the process 350 moves to a state 376 and writes data to the designated buffer. After all of the data has been sent to the designated buffer, the write valid bit is set in the translation entry table.

However, if a determination is made that the port write signal is not active at the decision state 372, the process 350 moves to a state 378 wherein the buffer data or write valid bit in the translation entry is not changed. The process then completes at an end state 380.

The following description provides one example of how a component can perform a read function using an embodiment of the buffer pool system.

Reading a Buffer

As described previously, a calling component provides a virtual line read pointer and a chunk pointer to the buffer pool. The buffer pool translates the virtual line read pointer to a physical pointer referencing the address in the line buffer array that will store the read data. The line pointer, in conjunction with the chunk pointer, will provide the address so that data can be multiplexed from the physical line buffer array to the read data port on the calling component. Read data is valid for as long as the buffer is allocated to the calling component.

Figure 8:
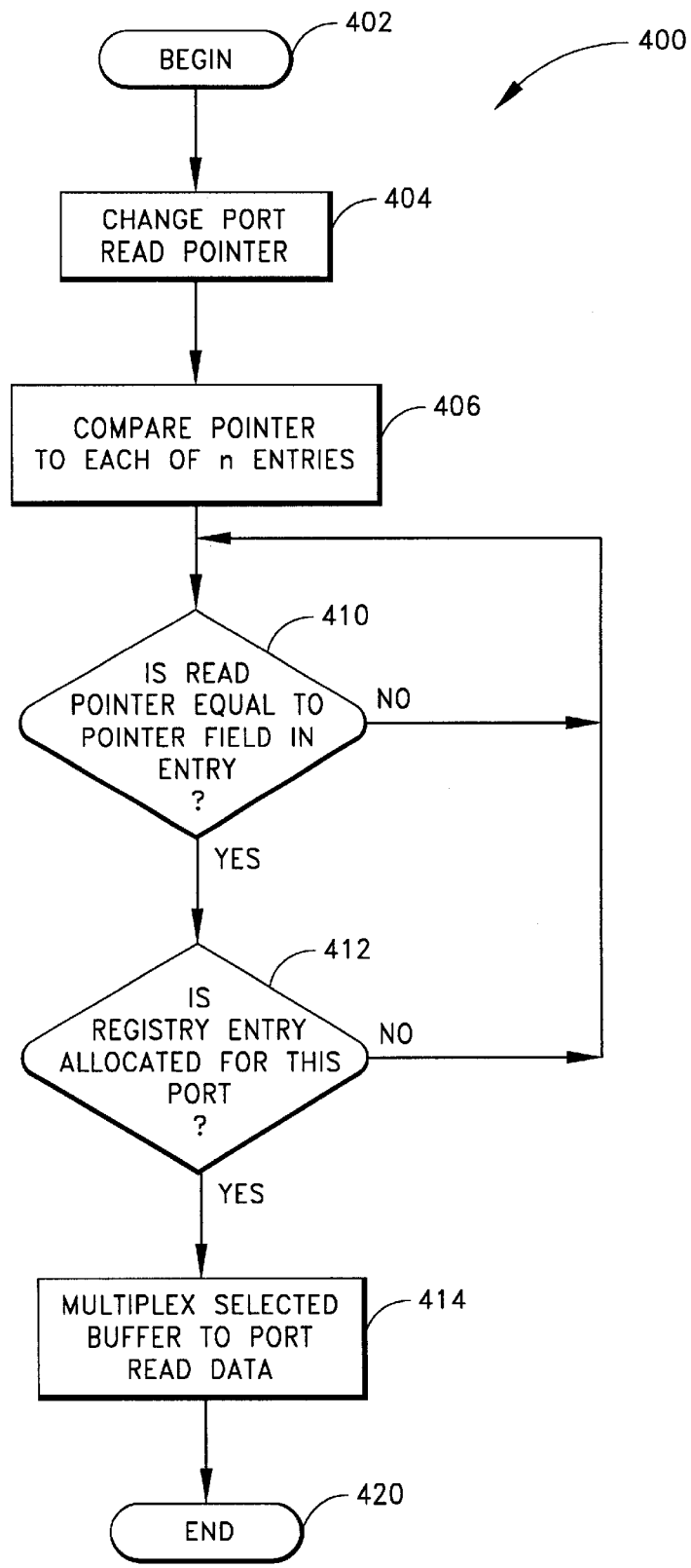
FIG. 8 is a flow chart of a process of reading data from a buffer pool.

Referring now to FIG. 8, a process 400 of reading data from the buffer pool is described. The process 400 begins at a start state 402 and then moves to a state 404 wherein the calling component changes its read pointer to a new value to initiate a new read request. The process 400 then moves to a state 406 wherein the value of the read pointer is compared against each entry within the translation entry table 230.

A determination is then made at a decision state 410 whether the value of the read pointer is equal to the value of the pointer field 235 in the translation entry table 230. When these values are equal, the system knows that the current entry in the table has been allocated for the calling port. The process 400 continues analyzing entries in the translation entry table 230 until a determination is made at the decision state 410 that the value of the read pointer equals a value in the pointer field of the translation entry table 230. The process 400 then moves to a decision state 412 and checks the PORT field 236 to determine whether the current entry was previously allocated for this port.

As discussed above in reference to FIG. 6, each port is allocated a position in the translation entry table 230 prior to providing a write or read request. If a determination is made at the decision state 412 that the current entry was not allocated for this particular port, the process returns to the decision state 410. However, if a determination is made that the current entry at this position in the translation entry table 230 has been allocated for this port, the process 400 moves to a state 414 wherein the data stored in the cache buffer associated with the current entry in the translation entry table is multiplexed to the current port. Thus, read data is sent from the buffer pool to the component identified by the port number and read pointer value. The process then ends at an end state 420.

Now that a description of how to allocate, read and write to buffers in the buffer pool has been provided, one exemplary mechanism for deallocating a buffer is described.

Deallocating a Buffer

A buffer is deallocated to indicate that it is ready to accept new data. This process occurs following a data read or write to the buffer pool. Deallocating a buffer puts the buffer back in use for other components. A buffer is deallocated when a virtual DEALLOCATE pointer 207 (FIG. 3) from the calling component selects the buffer to be deallocated, and a DEALLOCATE signal is strobed. The physical buffer is then marked as deallocated by changing the port ALLOCATE flag 236 (FIG. 4) to zero. Thus, the buffer is marked as available and ready to be used by another component/port. The DEALLOCATE pointer and the read pointer could be the same pointer, but used differently depending on whether the READ signal or DEALLOCATE signal is activated.

Figure 9:
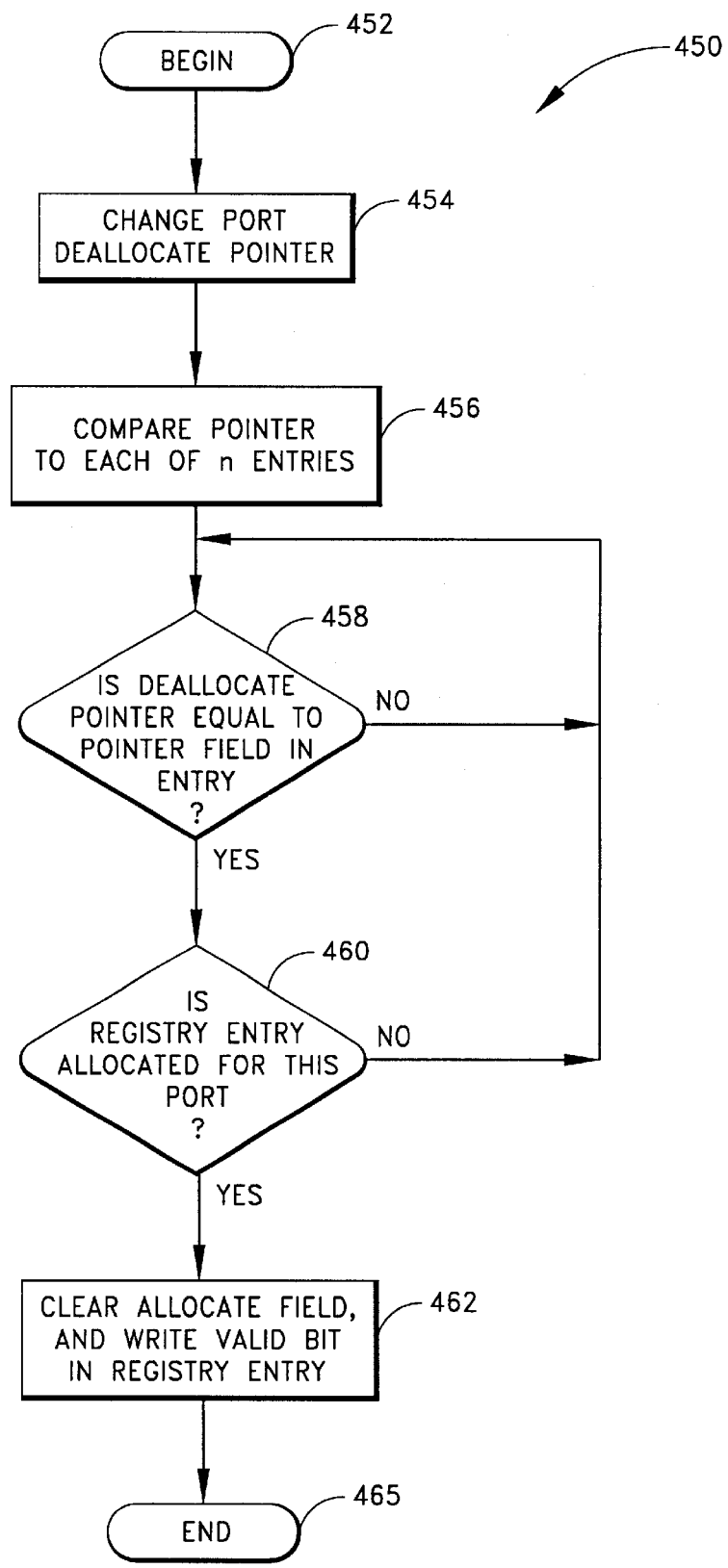
FIG. 9 is a flow chart of a process of deallocating a buffer in the buffer pool.

Referring to FIG. 9, a process 450 of deallocating a buffer in the buffer pool is described. The process 450 begins at a start state 452 and then moves to a state 454 wherein the calling port changes its DEALLOCATE pointer to indicate the pointer value in the translation entry table to deallocate.

The process 450 then moves to a state 456 wherein the value of the DEALLOCATE pointer from the calling port is compared against the pointer value 235 for each entry in the translation entry table 230. The process 450 then moves to a decision state 458 to determine whether the DEALLOCATE pointer value is equal to the value in the pointer field of any entry in the translation entry table 230. Once a determination is made at the decision state 458 that the DEALLOCATE pointer equals a value in the pointer field of an entry in the translation entry table, the process 450 moves to a decision state 460 to determine whether the PORT field contains the value of the calling port. This would indicate that the calling port was the port that had allocated this space in the buffer pool.

If the current entry in the translation entry table was not allocated for this particular port, the process returns the decision state 458. However, if the current entry in the translation entry table 230 was allocated for this port, the process 450 moves to a state 462 wherein the ALLOCATE field and write valid flag are cleared in the current entry of the translation entry table 230. The process 450 then completes at an end state 465. By clearing the ALLOCATE and write valid flags, the system indicates that the buffer is now available for use by other components.

The following section provides an overview of the signals generated by the buffer pool system. These signals mostly relate to the status of the buffers in the buffer pool. These signals are used by the other components in the computer to determine if the buffer is currently accepting data reads or writes.

Buffer Status

Each calling component is provided with status signals indicating the current state of each buffer in the buffer pool. In some cases a component will be provided with buffer EMPTY and FULL status relative to the buffers currently allocated. If a component has one buffer allocated but not written, the status signal from the buffer includes an active EMPTY status and an inactive FULL status. When one buffer is both allocated and written, the EMPTY status is inactive, and the FULL status is active.

In another example, two buffers are allocated and one buffer has data written. Here, both EMPTY and FULL status are inactive.

The status system is extensible for as many buffers as the calling component has allocated. That is, the status always reflects the state of the buffers allocated, as if the buffers belonged solely to the calling component. One exception arises when the component has no buffers allocated. In this case, the buffer status indicates that the buffer is both EMPTY and FULL.

The buffer indicates FULL so that when a component wants to write to the buffer pool, the component may first want to know if there is space available. For this reason, the component tests the FULL status. However, when the component is preparing to accept a read, the component wants to know that there is data available, so the empty status is tested.

Example of Transferring Data Using A Buffer Pool

Port x begins to request a buffer from the pool by setting the ALLOCATE pointer with the virtual pointer value the port will use to reference the buffer in successive operations. The port will activate an ALLOCATE signal to indicate that a buffer is being requested. The ALLOCATE signals from all the other i ports, and the allocated field values of all n translation entries are fed into a decoder to select an unallocated buffer.

If the ALLOCATE signal for other higher priority ports are all inactive, then the first available buffer is allocated. If there are m number of higher priority ports with the ALLOCATE signal active, then the mth available buffer is allocated for the read or write request. The translation entry associated with the selected buffer is then loaded with the pointer value from port x. In addition, the port x ALLOCATE bit is set in the allocate field 236 of the translation entry table. The buffer is now allocated, but the write process has not begun.

When the port x write pointer changes value, each of the entries in the translation entry table are searched for a pointer value that matches the value of the port x write pointer. Also, each entry with a matching pointer value is checked to ensure that the port x ALLOCATE bit is set for the selected entry. The input multiplexer for the physical buffer in the line buffer array associated with the selected translation entry will then select the write data and write strobes from port x.

When the write strobes from port x are activated, the chosen physical buffer in the line buffer array is updated with the write data from port x. In addition, the write valid bit is set for the associated entry in the translation entry table. When the read pointer from port x changes value, it is compared to each of the n entries in the translation entry table. When a match is found between the value of the port x read pointer and the value of the pointer field of the translation registry element, the physical buffer associated with that registry entry is selected as the output of the port x read data multiplexer.

The selected buffer remains allocated to port x until the port x DEALLOCATE strobe is activated. The port x DEALLOCATE pointer is compared to the pointer field of each of n translation entries. If the port x ALLOCATE bit is set, then this translation entry is selected, and the port ALLOCATE, and write valid bits are all cleared from this translation entry.

Conclusion

The buffer pool strategy will reduce the overall number of buffers in a system controller, while giving each interface more buffers to use during peak conditions in which one interface requires a large number of buffers, while the other interfaces are relatively idle. This has the effect of increasing system peak performance, while reducing the cost of the system controller by using less die area.

In addition, this system is designed to operate in a multitasking environment wherein many different ports or components are requesting buffers simultaneously. Since each buffer is pre-allocated to transfer data to/from a particular port and address, many separate processes can be proceeding simultaneously. This makes embodiments of the buffer pool system very fast and flexible at transferring data from one clock domain to another in a computer system.

The invention may be embodied in other specific forms without departing from its spirit or essential characteristics. Thus, the described embodiments are, in all respects, merely illustrative and not restrictive. Moreover, the appended claims, rather than the foregoing description, serve to define the scope of the invention. These claims embrace within their scope all changes which come within their meaning and range of equivalency.

What is claimed is:

1. A system for transferring data between buses in a computer, comprising:

a plurality of buffers; and control circuitry coupled to said plurality of buffers and configured to allocate a first buffer from said plurality of buffers to temporarily store first data to be transferred from a first bus, transfer said first data from the first bus to said first buffer, transfer said first data from first buffer to a second bus, de-allocate said first buffer; and allocate said first buffer to temporarily store a second data to be transferred from a third bus to a fourth bus.

2. The system of claim 1 further comprising:

a first pointer referencing the address of a computer component;

a second pointer referencing at least one buffer in the plurality of buffers; and a translation table, wherein the translation table comprises entries correlating the value of the first pointer with the value of the second pointer.

3. The system of claim 2, wherein the plurality of buffers is a line buffer array.

4. The system of claim 2, wherein the computer component is selected from the group consisting of: a processor, a Peripheral Component Interconnect device and an Advanced Graphics Interface device.

5. The system of claim 2, wherein the translation table includes a field for holding a port value.

6. A system in a computer for transferring data from a first clock domain to a second clock domain, comprising:

a plurality of buffers;

a first pointer in communication with a first component in the first clock domain and with said plurality of buffers;

a table in communication with the plurality of buffers, said table comprising a plurality of storage locations;

a first storage location in the table for storing the value of a pointer;

a second storage location in the table for storing a reference to one or more buffers in the plurality of buffers;

a third storage location in the table for storing the port value of the first component;

a controller coupled to said first pointer and said table and configured to allocate a first buffer from said plurality of buffers to temporarily store first data to be transferred from a first bus, transfer said first data from the first clock domain to said first buffer, transfer said first data from first buffer to a second clock domain, de-allocate said first buffer; and allocate said first buffer to temporarily store a second data to be transferred from a third clock domain to said first clock domain.

7. The system of claim 6, wherein the plurality of buffers is a line buffer array.

8. The system of claim 6, wherein, the first component is selected from the group consisting of: a processor, a Peripheral Component Interconnect device and an Advanced Graphics Port device.

9. The system of claim 6, wherein the table comprises a fourth storage location for storing an ALLOCATE flag indicative of whether the referenced buffer has been allocated to the first component.

10. A system for transferring data across interfaces within a computer system, comprising:

a plurality of buffers;

a table in communication with the plurality of buffers, said table comprising a plurality of storage locations;

a first storage location in the table for storing the value of a pointer;

a second storage location in the table for storing a reference to one or more buffers in the plurality of buffers; and a processor configured to provide the pointer to the address of data to be transferred from a first interface to a second interface;

determine whether any buffer in a buffer pool is available to accept the data;

store the value of the pointer in the first storage location in the table if a buffer is available, wherein said table location also references the available buffer;

transfer the data from the location identified by the provided address to the available buffer;

provide a second pointer to the address of data to be transferred from a third interface to one of said first interface, said second interface and a fourth interface; and determining whether any buffer in said buffer pool is available to accept the data.

11. The computer system of claim 10, wherein the plurality of buffers is a line buffer array.

12. The computer system of claim 10, wherein, the processor is an Intel Pentium processor.

13. The computer system of claim 10, wherein the table comprises a third storage location for storing the port value of the processor.

14. The computer system of claim 13, wherein the table comprises a fourth storage location for storing an ALLOCATE bit indicative of the allocated state of the one or more buffers.

* * * * *